United States Patent [19]
Ueyama

[11] Patent Number: 5,618,226
[45] Date of Patent: Apr. 8, 1997

[54] APPARATUS FOR GRINDING A RECIPROCAL TRIMMING BLADE

[75] Inventor: Hisashi Ueyama, Okayama, Japan

[73] Assignee: Nikkari Co., Ltd., Okayama, Japan

[21] Appl. No.: 607,378

[22] Filed: Feb. 27, 1996

[30] Foreign Application Priority Data

Mar. 6, 1995 [JP] Japan ................................ 7-074441

[51] Int. Cl.[6] ............................................. B24B 7/00
[52] U.S. Cl. ...................... 451/234; 451/225; 451/231; 451/279; 451/363; 451/367; 83/473
[58] Field of Search .................................. 451/234, 231, 451/232, 279, 126, 278, 364, 371, 342–343, 363, 380, 349, 367, 293, 225; 83/581, 471.3, 473, 372

[56] References Cited

U.S. PATENT DOCUMENTS

| | | |
|---|---|---|
| 471,673 | 9/1984 | Rosenquist . |
| 630,688 | 8/1899 | Green ........................................ 451/225 |
| 2,151,204 | 3/1939 | Hartman . |
| 2,369,642 | 2/1945 | Benning ................................... 451/367 |
| 2,568,062 | 9/1951 | Fitch ......................................... 451/363 |
| 2,576,090 | 11/1951 | Krause ...................................... 83/473 |
| 4,173,849 | 11/1979 | Mar ........................................... 451/231 |
| 4,228,618 | 10/1980 | Jensen ....................................... 451/279 |
| 4,574,530 | 3/1986 | Handler et al. ......................... 451/279 |
| 5,404,779 | 4/1995 | Break ........................................ 83/473 |

FOREIGN PATENT DOCUMENTS

| | | |
|---|---|---|
| 649748 | 12/1928 | France . |
| 401002854 | 1/1989 | Japan ....................................... 451/367 |
| 2250937A | 6/1992 | United Kingdom ............ B24B 23/00 |

*Primary Examiner*—Robert A. Rose
*Assistant Examiner*—George Nguyen
*Attorney, Agent, or Firm*—Koda and Androlia

[57] ABSTRACT

An apparatus for grinding a blade used in, for example, a glass or hedge trimmer including grinder support and a blade mount provided close to each other. The grinder support holds a grinder, which has a round grindstone, in such a manner that the grinding surface of the grindstone can be oriented not only horizontally and vertically but also in an inclined direction so as to meet the action angle of the tooth of the blade; and the blade mount includes a horizontal surface section and a sloped surface section so that the trimmer blade is place thereon when ground by the grindstone held on the grinder support.

13 Claims, 4 Drawing Sheets

5,618,226

APPARATUS FOR GRINDING A RECIPROCAL TRIMMING BLADE

BACKGROUND OF THE INVENTION

1. Field of the Invention

The present invention relates to a grinding apparatus and more particularly to an apparatus for grinding a reciprocal trimming blade of, for example, a glass trimmer.

2. Prior Art

A grass trimmer or hedge trimmer that uses reciprocal trimming blades trims, without fail, grass and hedges that come within the length of the trimming blades of the trimmer which are reciprocating. Thus, the trimmer is used for trimming grass that grows on footpaths between rice fields. However, the reciprocal trimming blades wear away as they are used, and therefore, the blades need to be ground appropriately so that the teeth of the blades are sharpened. In many cases, the trimming blades are sharpened by a hand-held type grinder or the like with the blades remaining on the grass trimmer.

A typical reciprocal trimming blade comprises an elongated main body and a plurality of cutting-edge forming sections or teeth each having a substantially triangle-shape and arranged along the front and rear edges (or both side edges) of the elongated main body at a predetermined pitch. Each of the teeth defines a particular angle relative to the elongated main body, and this angle is called an action (or wedge) angle as will be detailed later; and in order to sharpen all of the teeth accurately and efficiently, a substantial amount of experience and skill is required.

SUMMARY OF THE INVENTION

Accordingly, the object of the present invention is to provide a grinding apparatus with which a reciprocal trimming blade can be accurately and efficiently sharpened without requiring a substantial amount of skill and experience.

The object of the present invention is accomplished by a unique structure for a grinding apparatus for reciprocal trimming blades, and the apparatus includes a grinder support and a blade mount, in which:

the grinder support holds a grinder that has a grindstone shaft and a round grindstone mounted on the grindstone shaft, the grinder support being for rotating the grinder so as to position the grindstone at a specified angle while the grinding surface of the grindstone is kept at right angles with respect to the axis of the grindstone shaft of the grinder; and the blade mount is provided near the grindstone and includes a horizontal surface and a sloped surface for placing the reciprocal trimming blade thereon so that the trimming blade is ground by the grindstone of the grinder held in the grinder support.

In accordance with the present invention, the grindstone can be set inclined so that its grinding surface is at the same angle, with respect to a vertical direction, as the action angle of the trimming blade; thus, the side edge of a tooth of the trimmer blade is automatically aligned at the action angle by merely placing the reciprocal trimming blade on the horizontal surface of the blade mount. Accordingly, when the side edge of the tooth of the trimmer is pressed against the grinding surface of the grindstone which is spinning, the side edge of the tooth is accurately sharpened into the action angle by the grindstone.

On the other hand, the grindstone can also be set so that its grinding surface is positioned horizontally; and when the grinding surface of the grindstone is horizontally positioned, the tip edge of the tooth of the trimming blade is sharpened by merely pressing the trimming blade which is placed on the sloped surface of the blade mount against the thus horizontally positioned and spinning grindstone.

DETAILED DESCRIPTION OF THE PREFERRED EMBODIMENTS

Embodiments of the present invention will be described below with reference to the accompanying drawings.

Figure 5:
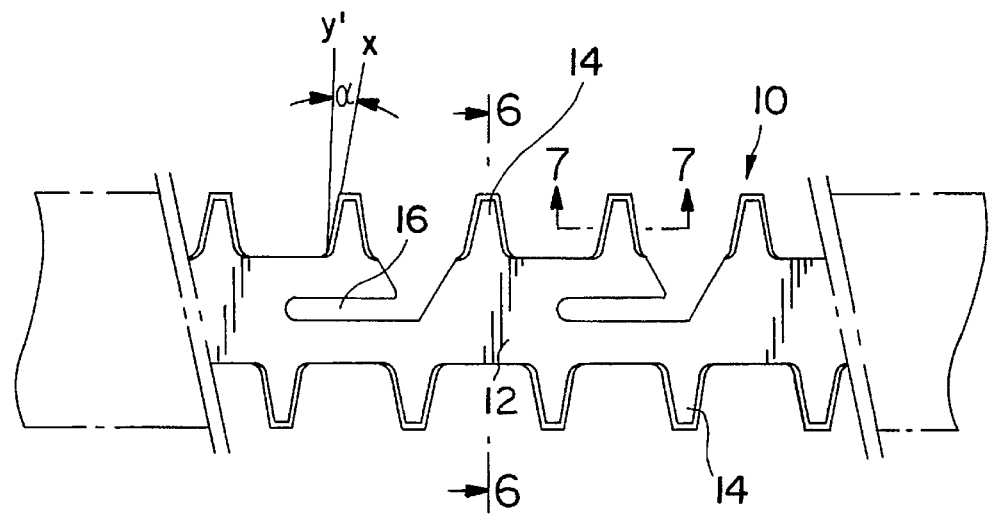
FIG. 5 shows a top view of a part of a reciprocal trimming blade to be ground by the grinding apparatus of the present invention.
Figure 6:
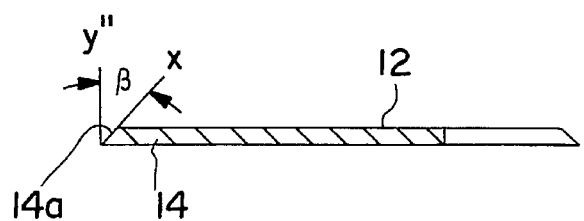
FIG. 6 shows a cross-sectional view taken along the line 6—6 in FIG. 5.
Figure 7:
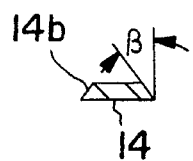
FIG. 7 shows a cross-sectional view taken along the line 7—7 in FIG. 5.

FIG. 5 shows a typical reciprocal trimming blade used in a grass or hedge trimmer; and the cross section taken along the line 6—6 is shown in FIG. 6, and the cross section taken along the line 7—7 is shown in FIG. 7.

The reciprocal trimming blade (hereunder called "trimming blade") 10 shown in FIGS. 5 to 7 has an elongated main body 12 and a plurality of trimming blade forming sections or teeth 14 each defining a substantially triangular shape as best shown in FIG. 5. The teeth 14 are provided on both sides or along the front and rear sides of the elongated main body 12 at a predetermined pitch. The reference numeral 16 denotes a cut-out formed in the elongated main body 12. This cut-out 16 is for a mounting bolt that is used to securely mount the trimming blade 10 to a blade base plate (not shown in these Figures) of the grass or hedge trimmer. In the trimmer blade shown in FIG. 5, one end of the cut-out 16 opens to the front side (which is the upper side in FIG. 5) of the main body 12 in order to facilitate the mounting of the trimming blade 10 to the trimmer.

An angle $\alpha$ is a cutting angle and is defined (as viewed in the top view in FIG. 5) between a blade edge line x on the side edge of the tooth 14 and a perpendicular line y which is perpendicular to a center line (not shown) extending in the direction of the length of the main body 12. An angle $\beta$ shown in FIG. 6 is an action angle, and this angle is defined between the line z extended from the cutting-edge surface 14a at the tip end of the tooth 14 and the perpendicular line y" which is perpendicular to the bottom surface of the tooth 14. Both cutting and action angles are very important to maintain the sharpness of the blades. As seen from FIG. 7, the action angle $\beta$ is further provided at side cutting-edge surface of the tooth 14 (only one action angle of one side edge of the tooth 14 is shown in FIG. 7, the opposite side has the same action angle).

Figure 3:
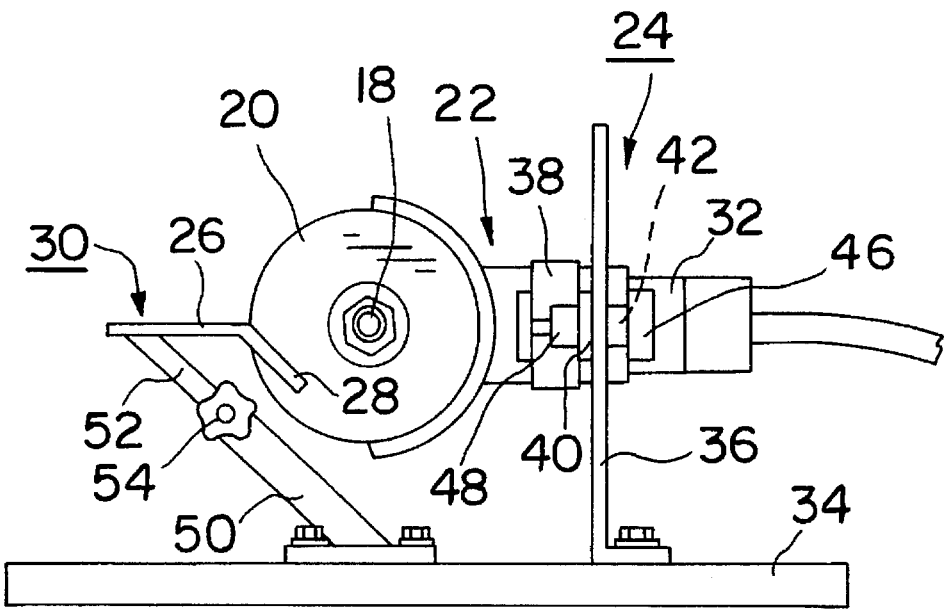
FIG. 3 shows a side view of the blade grinding apparatus in accordance with the embodiment of the present invention, the grindstone being positioned vertically.
Figure 4:
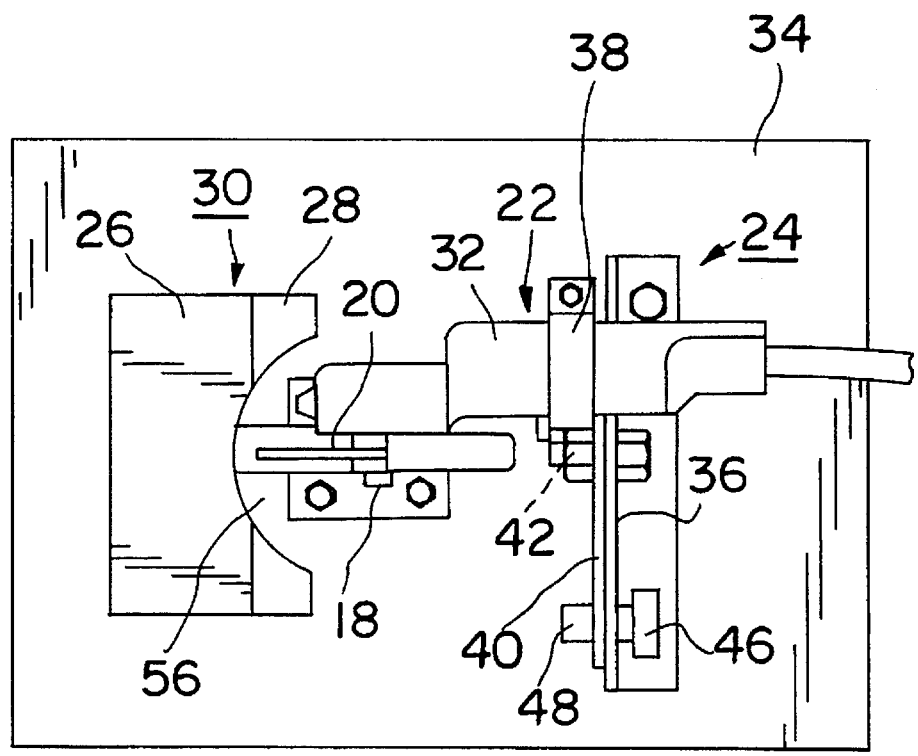
FIG. 4 shows a top view thereof.

FIG. 3 shows the blade grinding apparatus for sharpening the trimming blade 10 described above. FIG. 3 is a side view of the side of the apparatus, and FIG. 4 is a top view thereof. The blade grinding apparatus includes a grinder support 24 and a blade mount 30 which are located close to each other.

The grinder support 24 stands vertically on the base 34 so as to hold a grinder 22 thereon. The grinder 22 includes a grindstone shaft 18 and a grindstone 20 which is in the shape of a circular plate and spins on the grindstone shaft 18. The grindstone 20 is mounted on this grindstone shaft 18 so that its grinding surface 20a on both sides thereof are at right angles with respect to the axis of the grindstone shaft 18. The grinder support 24 is arranged so that the grinder 22, while the grinding surface 20a of the grindstone 20 is maintained at right angles with respect to a vertical plane that includes the axis of the grindstone shaft 18, can be rotated by and then fixed at a specified angle in the vertical plane. More specifically, the grinder 22 can be rotated on the grinder support 24 so that such a rotation of the grinder 22 brings the grindstone 20 mounted thereon to be horizontal (shown in FIG. 2) and vertical (shown in Figures 3 and 4) and in between as will be detailed later.

On the other hand, the blade mount 30 is provided adjacent to the grindstone 20, and it includes a horizontal surface section 26 and a sloped surface section 28 so that the trimming blade 10 is placed on these surface sections 26 and 28.

The grinder 22 is, for example, a hand held type and includes a (cylindrical) main body section 32 which has the grindstone 20 at one end and includes therein a motor and a grindstone spinning means (not shown). However, other types of grinders may be used.

The grinder support 24 includes a vertical plate 36 standing upright on the base 34 and a rotary shaft 42 horizontally provided on the vertical plate 36. The grinder support 24 further includes an arm 40 rotatably provided on the rotary shaft 42, and this arm 40 includes at its one end an integrally formed support device 38 for holding the grinder 22. In other words, the arm 40 can rotate along one side surface of the vertical plate 36 about the rotary shaft 42 which is horizontally provided on the vertical plate 36.

Figure 1:
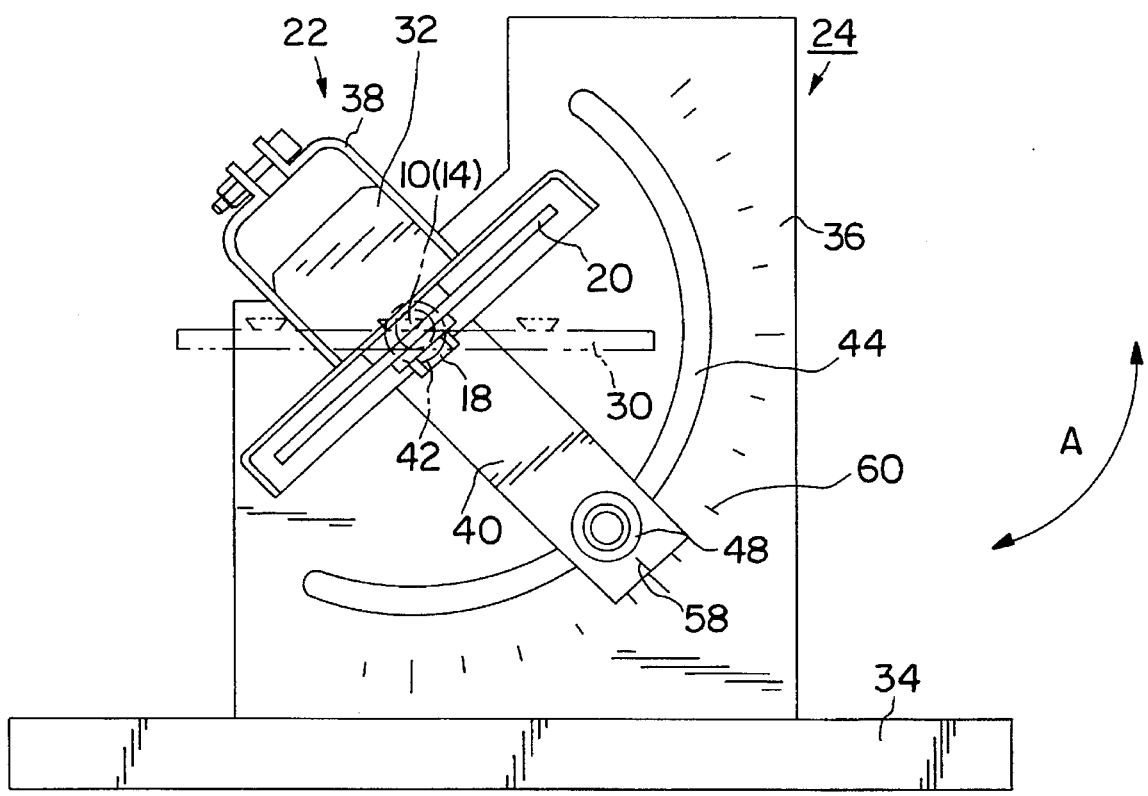
FIG. 1 shows a front view of a blade grinding apparatus in accordance with an embodiment of the present invention, the round grindstone used therein being shown at an inclined position.
Figure 2:
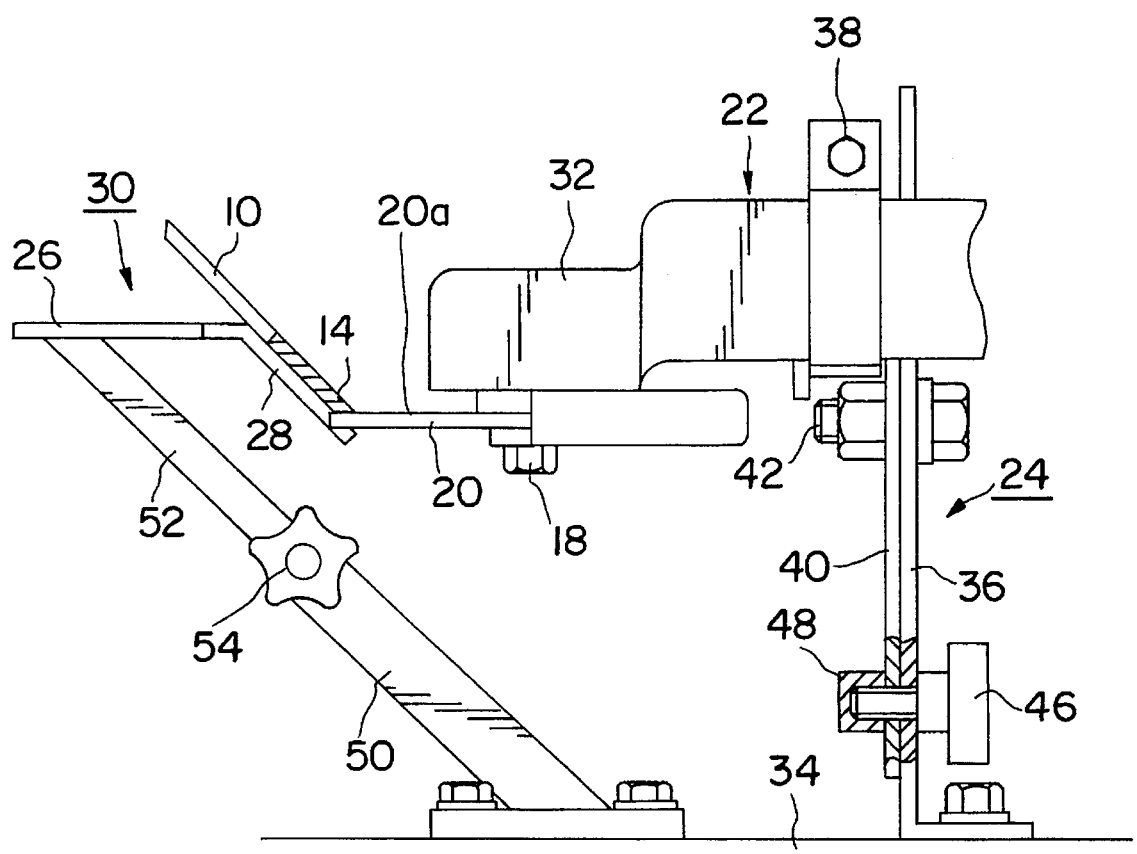
FIG. 2 shows the essential portion of the blade grinding apparatus in accordance with the embodiment of the present invention, the grindstone being positioned horizontally.

The vertical plate 36 is provided with an elongated guide slot 44 (as seen in FIG. 1) which is in the shape of an arc having the center thereof on the axial center of the rotary shaft 42. As best shown in FIG. 2, a tightening bolt 46 with a knob is passed from one side of the vertical plate 36 through the guide slot 44 so that bolt 46 is tightened and loosened with respect to a nut 48 that is provided on the other side of the arm 40. In particular, the arm 40 is positionally fixed on the surface of the vertical plate 36 when the tightening bolt 46 is tightened.

As seen from FIG. 1, the arm 40 is provided so as to extend in a direction perpendicular to the grinding surface 20a of the grindstone 20, and the center of the arm 40 in the width-wise direction thereof is set to be on a plane that includes the axis of the grindstone shaft 18.

With the structure described above, after loosening the tightening bolt 46, the arm 40 is rotated (by hand) about the rotary shaft 42 by being guided by the tightening bolt 46 engaged with the arc-shaped guide slot 44. When the arm 40 is rotated, the grinder 22 mounted at one end of the arm 40 via the support device 38 is rotated in the direction of arrow A. At a desired position, the tightening bolt 46 is tightened into the nut 48 so that the arm 40 is positionally fixed at the desired angle. In other words, when the arm 40 is rotated, the grinder 22 mounted thereon is rotated; and when the grinder 22 is thus rotated, the grinding surface 20a of the grindstone 20 attached to the grinder 22 is kept at right angles with respect to a vertical plane that includes the axis of the grindstone shaft 18, and then the grinder 22 is positionally fixed when the tightening bolt 46 is tightened so that the grindstone 20 is set at the desired angle.

The rotary shaft 42 is provided so that its horizontal axis is preferably on an imaginary line which is obtained by perpendicularly crossing two planes: a plane that includes the grinding surface of the grindstone 20 and another plane that includes the axis of the grindstone shaft 18. With this relationship and arrangement, the diametrical center of the grinding surface of the grindstone 20 is prevented from being positionally shifted.

The blade mount 30 is provided adjacent to the grindstone 20. The blade mount 30 includes a blade plate which comprises a horizontal surface section 26 and a sloped surface section 28 so that the trimming blade 10 is placed on these surface sections 26 and 28.

More specifically, the blade mount 30 includes a main leg 50 fixed at one end thereof to the base 34 so as to stand on the base 34 and an auxiliary leg 52 which is connected to the main leg 50. The horizontal surface section 26 of the blade plate is provided at the upper end of the auxiliary leg 52, and the sloped surface section 28 is formed at the rear side (the grindstone 20 side) of the horizontal surface section 26. A slope angle of the sloped surface section 28 (that is defined with respect to a horizontal surface) is preferably set at the same angle as the action angle β which is at the cutting-edge surface of the tooth 14 of the trimmer blade 10.

The main leg 50 is tilted at the same angle as the sloped surface section 28; in other words, the main leg 50 is parallel to the sloped surface section 28. In addition, the auxiliary leg 52 is preferably extendible and retractable with respect to the main leg 50. Thus, the auxiliary leg 52 is inserted into the main leg 50, and it is extended out of and retracted into the main leg 50 and positionally fixed with one another by a tightening screw 54.

It is preferable to install the grinder support 24 and the blade mount 30 as closely as possible with respect to each other. In this respect, a cut-out 56 is formed in the horizontal surface section 26 and the sloped surface section 28 of the blade mount 30. The cut-out 56 allows the grindstone 20 to take the horizontal and vertical postures and the inclined posture within the cut-out 56.

The grinding of the trimming blade 10 is performed in the following manner:

As shown in FIG. 1 and FIG. 2, the tightening bolt 46 and the nut 48 are operated, and the arm 40 is rotated about the rotary shaft 42 until the arm 40 is at an angle at which the grinding surface of the grindstone 20 is tilted at the action angle β of the tooth 14 of the trimming blade 10. An example of the tilted grindstone 20 is shown in FIG. 1. Then, the tightening bolt 46 is tightened so as to positionally secure the arm 40. In order to facilitate the rotation of the arm 40 or to facilitate the angle setting operation of the grindstone 20, a center line 50 is formed at the (widthwise) center of the arm 40, and the vertical plate 36 is marked with angle graduations 60 along the guide slot 44.

After the angle setting operation, the trimming blade 10 is placed on the blade mount 30, and the blade line of the tooth 14 on its side edge (which is represented by the line x in FIG. 5) is brought into contact with and pushed against the grinding surface of the spinning grindstone 20. As a result, the side cutting-edge surface 14b of the tooth 14 is ground by the spinning grindstone 20 while the action angle is maintained (see FIG. 1). To bring the entire blade line into contact with the grinding surface, the trimming blade 10 placed on the mounting table 30 is inclined by the cutting angle α.

The above described operation is carried out for the side cutting-edge surfaces on both sides of each one of all teeth 14.

Next, the grinding surface of the grindstone 20 is brought into a horizontal position by rotating the arm 40 as shown in FIG. 2. The trimming blade 10 is placed on the sloped surface section 28 of the blade mount 30 so that the cutting-edge surface 14a of the tip end of the tooth 14 is ground by the spinning grindstone 20 as shown in FIG. 2. In this case, the auxiliary leg 52 is adjusted (in other words, extended or retracted) so that the tip end cutting-edge surface comes into contact with the spinning grindstone 20. The grinding operation to the tip end cutting-edge is carried out for all of the teeth 14.

On completion of all the operations described above, grinding of the trimming blade 10 is completed.

As seen from the above, in accordance with the present invention, a trimming blade is placed on the horizontal surface section and on the sloped surface section of the blade mount, and the blade surface acts upon the grindstone. Accordingly, the action angle defined at the tooth is accurately reproduced, and this blade grinding work is accurately and efficiently carried out without requiring substantial skill and experience.

I claim:

1. An apparatus for grinding a reciprocal trimming blade characterized in that said apparatus comprises:
    a grinder support for supporting a grinder which includes a grindstone shaft and a grindstone in the shape of a circular plate mounted perpendicularly to said grindstone shaft, said grinder support supporting said grinder in a manner that said grinder, while a grinding surface of said grindstone is maintained at right angles with respect to a vertical plane that includes said grindstone shaft, is rotated by and then fixed at a specified angle; and
    a blade mount provided adjacent to said grindstone and having a horizontal surface and a sloped surface for alternately mounting said reciprocal trimming blade thereon.

2. An apparatus for grinding a reciprocal trimming blade according to claim 1, wherein said grinder is a hand-held type grinder.

3. An apparatus for grinding a reciprocal trimming blade according to claim 1 or 2, wherein said grinder support allows said grinder to be rotated about an axis of a rotary shaft which is provided on a crossing line defined by a plane that includes said grinding surface and a plane that includes said grindstone shaft which is perpendicular to said plane including said grinding surface.

4. An apparatus for grinding a reciprocal trimming blade according to claim 1 or 2, a slope angle of said sloped surface of said blade mount is set to be the same as an action angle that is formed in a tooth of said reciprocal trimming blade.

5. An apparatus for grinding a reciprocal trimming blade according to claim 1 or 2, wherein said blade mount can be extended and retracted in a direction parallel to said sloped surface.

6. An apparatus for grinding a reciprocal trimming blade according to claim 1 or 2, wherein said blade mount is provided with a cut-out portion in said horizontal surface and said sloped surface so as to allow said grindstone to rotate therein, and said grindstone is inserted into said cut-out portion.

7. An apparatus for grinding a reciprocal trimming blade according to claim 3, a slope angle of said sloped surface of said blade mount is set to be the same as an action angle that is formed in a tooth of said reciprocal trimming blade.

8. An apparatus for grinding a reciprocal trimming blade according to claim 3, wherein said blade mount can be extended and retracted in a direction parallel to said sloped surface.

9. An apparatus for grinding a reciprocal trimming blade according to claim 3, wherein said blade mount is provided with a cut-out portion in said horizontal surface and said sloped surface so as to allow said grindstone to rotate therein, and said grindstone is inserted into said cut-out portion.

10. An apparatus for grinding a reciprocal trimming blade according to claim 4, wherein said blade mount can be extended and retracted in a direction parallel to said sloped surface.

11. An apparatus for grinding a reciprocal trimming blade according to claim 4, wherein said blade mount is provided with a cut-out portion in said horizontal surface and said sloped surface so as to allow said grindstone to rotate therein, and said grindstone is inserted into said cut-out portion.

12. An apparatus for grinding a reciprocal trimming blade according to claim 5, wherein said blade mount is provided with a cut-out portion in said horizontal surface and said sloped surface so as to allow said grindstone to rotate therein, and said grindstone is inserted into said cut-out portion.

13. An apparatus for grinding a trimming blade comprising a grinder support and a blade mount which are located close to each other, wherein:
    said grinder support comprising:
        a vertical plate provided upright on a base, said vertical plate being provided with an arc-shaped guide slot;
        a rotary shaft horizontally provided on said vertical plate,
        an arm rotatably mounted on said rotary shaft,
        a grinder holder provided at one end of said arm so as to hold a grinder thereon, said grinder being of a type having a round grindstone,
        a positioning means provided at another end of said arm, said positioning means being engaged with said arc-shaped guide slot so that said positioning means positionally fix said arm after being moved along said arc-shaped guide slot; and
    said blade mount comprising:
        a main leg provided so as to stand on said base;
        a retractable auxiliary leg connected to said main leg; and
        a blade plate assembly for placing said trimmer blade thereon, said blade plate assembly comprising a horizontal surface section and a sloped surface section formed on one side of said horizontal surface section, said blade plate assembly further comprising a cut-out formed in said horizontal and sloped surface sections so that said grindstone of said grinder can change its surface orientation within said cut-out.

* * * * *